United States Patent Office 2,993,915
Patented July 25, 1961

2,993,915
TETRAHYDROFURYL AND TETRAHYDRO-
FURFURYL GLYCIDYL ETHERS
Leo S. Luskin, Philadelphia, Pa., assignor to Rohm & Haas Company, Philadelphia, Pa., a corporation of Delaware
No Drawing. Filed Feb. 6, 1959, Ser. No. 791,539
4 Claims. (Cl. 260—347.8)

The present invention concerns the new compounds of the class of tetrahydrofuryl and tetrahydrofurfuryl glycidyl ethers. It is also concerned with a method of crease-proofing cellulosic fabrics using these ethers.

The compounds of the present invention are monoglycidyl ethers having the formula

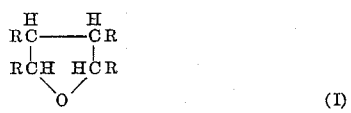

wherein one of the groups R is H, one of the groups R is selected from the group consisting of

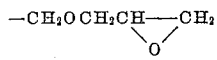

and

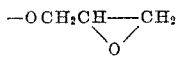

with the proviso that there are at least 2 carbon atoms between each pair of oxygen atoms in the compound of Formula I, and each of the other two groups R is individually selected from the group consisting of H and $CH_3$.

It is to be noted that when the compound contains the group

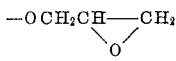

and
such group must be in the β-position relative to the oxygen atom in the 5-membered ring so that there will be at least two carbon atoms between each pair of oxygen atoms in the resulting compound.

These compounds are obtained from the reaction products of epichlorohydrin with a tetrahydro-β-furyl alcohol or a tetrahydrofurfuryl alcohol. The alcohols which may be reacted with epichlorohydrin are the following: tetrahydro-α-furfuryl alcohol, tetrahydro-β-furfuryl alcohol, tetrahydro-β-furyl alcohol, substituted tetrahydro-α-furfuryl alcohols, substituted tetrahydro-β-furfuryl alcohols, or substituted tetrahydro-β-furyl alcohols, such as 2-methyl-tetrahydro-β-furyl alcohol, 4-methyl-tetrahydro-β-furyl alcohol, 5-methyl-tetrahydro-β-furyl alcohol, 2,4-dimethyl-tetrahydro-β-furyl alcohol, 2,5-dimethyl-tetrahydro-β-furyl alcohol, and 4,5-dimethyl-tetrahydro-β-furyl alcohol.

The reaction of one of the alcohols above with epichlorohydrin may be effected at temperatures of 40° to 100° C. and is generally complete in a period of 3 to 6 hours. The reaction may be effected in an inert solvent such as benzene, xylenes, toluene, chloroform, or the like or an excess of the alcohol used as the reactant may be employed as the solvent medium. Acidic catalysts of the Lewis type such as stannic chloride, sulfuric acid, ferric chloride, aluminum chloride, or an ether complex of boronfluoride may be employed.

The condensation product of the alcohol with the epichlorohydrin contains a chlorine atom adjacent a hydroxyl group and the new compounds of the present invention are derived therefrom by dehydrohalogenation. This is effected in the presence of a base which accepts the hydrogen halide such as an alkali metal hydroxide, carbonate, or an organic tertiary amine. The temperature of the dehydrohalogenation reaction may be anywhere from 0° to 80° C. and may take from 3 to 6 hours. A solvent is not necessary but an inert solvent may be used. Suitable solvents include ether, dioxane, alcohols, or even water.

The new compounds of Formula I are water-soluble liquids useful as plasticizers for vinyl resins, particularly those containing chlorine such as polyvinyl chloride or copolymers of vinyl chloride in connection with which the new compounds also serve to stabilize the plasticized composition. The new compounds are useful as fungicides, fungistatic agents, insecticides, nematocides, and are useful as lubricating and softening agents for textiles. They are also particularly useful in the treatment of textiles formed of cellulosic fibers such as cotton and regenerated cellulose fibers for crease-proofing and for the stabilization of such fabrics against shrinkage on washing. Thus, they are useful for producing wash-wear and drip-dry cotton or rayon fabrics. The ability of the new compounds to crease-proof a cellulose fabric is quite surprising since the compound is a mono-epoxide and the tetrahydrofuryl and tetrahydrofurfuryl radicals have not heretofore been considered reactive toward cellulose. Since crease-proofing involves cross-linking of cellulose molecules, the monoglycidyl ethers of the present invention must act in a difunctional manner although there is only one glycidyl group in the compound. While it is not intended that the invention insofar as the treatment of cellulosic fabrics is concerned should be limited to any particular theory, it is hypothesized that the cross-linking of cellulose by the compounds of the present invention may be effected by a mechanism expressed in the following equations wherein Cell-OH represents cellulose:

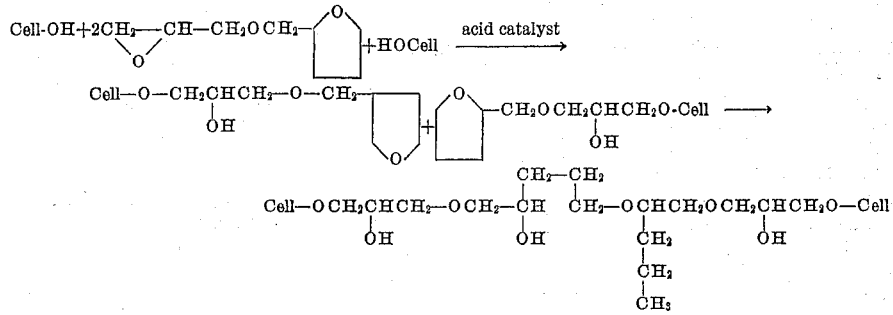

In the utilization of the new compounds for the modification of cellulosic fabrics for crease-proofing, etc., the following advantages occur. The cellulosic products contain oxygen only in the form of hydroxyl and ether linkages, no ester linkages being present, so that the products are characterized by excellent resistance against alkali. Because of the resistance to alkali, the treated cellulosic fabrics retain their improvement in crease-resistance and shrinkage-reduction even after washing in the usual detergents which are commonly alkaline in character. The cellulosic products obtained by treatment with the compounds are not subject to chlorine damage. Since they do not retain chlorine, the use of bleaching agents containing chlorine does not cause deterioration either by way of discoloration or loss in tensile strength even when the treated fabrics which have been bleached are subjected to ironing temperatures. The cellulosic products obtained by treatment with the new compounds are also insoluble because of their cross-linked character so that the improvements in shrinkage and crease-resistance are obtained even after dry-cleaning operations. The treated fabrics also retain excellent hand and feel.

The treatment of the cellulosic fabrics with the new monoglycidyl ethers of the present invention may be effected most advantageously by means of aqueous solutions in which the ether is dissolved at a concentration which may vary from 1 to 30% by weight. Preferably, the concentration is from 5 to 12% to obtain the maximum benefits in crease-proofing and shrinkage-reduction. The treatment may be carried out in the presence of a catalyst. As a catalyst, there may be used metal salts of acids having the composition $H_a(XY_b)$, where H is hydrogen, $a$ is an integer which depends on the valence of the complex ion and may have a value of 1 to 3, X is a non-metal selected from the group consisting of boron, silicon, sulfur, and chlorine, said non-metal being in a state where its valence is from 3 to 7, Y is fluorine or oxygen, and $b$ is an integer having a value of 4 or 6. The metals of these salts are those of groups I$b$, II, III$b$, IV, and VIII of the periodic table in T. Moeller, "Inorganic Chemistry," John Wiley & Sons, New York, 1952, which have an atomic weight of at least 12. Salts of perchloric and fluoboric acids are very efficient catalysts, particularly their zinc, lead, copper, and magnesium compounds. Salts of sulfuric acid, such as aluminum and copper sulfate, and of fluosilicic acid, such as magnesium, zinc, and copper fluosilicates, also are active as catalysts. Other acidic compounds, oxalic acid, for example, may also be used as catalysts.

Conveniently, the amount of catalyst may vary from about 0.2 to 2% and is preferably in the range of 0.5 to 1% concentration in the aqueous solution of the glycidyl ether.

The catalyzed solution of the glycidyl ether is compatible with solutions or dispersions of most of the common textile finishing agents, such as synthetic polymer latices and aminoplast resins or precondensates, so that they may be applied with the glycidyl ether to produce changes in the hand or other properties of the fabric.

The aqueous solution containing the glycidyl ether and catalyst may be applied to the fabric in any suitable manner such as by spraying or impregnation. In general, it is preferable to use some method of impregnation. With piece goods, this is conveniently carried out with the various machines used for treating fabrics in open width, such as pads or jigs. However, it is not required that the impregnation be carried out in open width, and the fabric may be handled in any form. In treating garments or other articles made from cellulosic fabrics, the impregnation may be carried out in a tumble wheel, laundry machine, or other suitable equipment. After application of the solution, it is desirable to remove the excess solution by squeezing the fabric between rollers, or by shaking or centrifuging it, in order to insure a more even treatment. The fabric treated with solution may be dried, such as by air-drying at normal room temperature or by heating in a drying oven at temperatures of 140° F. and up. The drying and curing operations are preferably done with the fabric open and flat, so that it will have a smooth and even appearance when finished. In a preferred embodiment, the impregnated fabric, immediately after impregnation and without preliminary low-temperature drying is carried in open width by a tenter frame through a curing oven where it is subjected to temperatures of about 250° F. to about 400° F. or higher for a period of time ranging from about one minute to about one-half hour or more, the shorter period being employed at the higher temperature and vice versa. Entirely satisfactory results are obtained by heating for ten minutes at about 300° F. This curing operation not only dries the impregnated fabric but apparently causes a reaction between the glycidyl ether and the hydroxyl groups of the cellulose.

The following examples illustrate the present invention, the parts and percentages therein being by weight unless otherwise noted. The crease-recovery values given below are those determined by the Shirley Institute Procedure (British Standard Notebook No. 11, 1949 edition, page 128).

*Example 1*

(a) Epichlorohydrin (277.5 g., 3 moles) was added at 47° C. to a mixture of tetrahydro-α-furfuryl alcohol (918 g., 9 moles, redistilled) and boron fluoride ether complex (3 ml.). The mixture, which warmed itself to 65° C. during the addition, was warmed at 85° C. for 4½ hours. The reaction mixture was cooled, and 6% sodium carbonate solution (60 ml.) was added to destroy the catalyst. After standing overnight, it was then filtered and distilled. Tetrahydrofurfuryl alcohol (510 g.) was recovered and there was obtained 376 g. (65%) of tetrahydro-α-furfuryl 3-chloro-2-hydroxypropyl ether as a slightly pink oil, boiling range 92° to 110° C. (0.2 mm. Hg), $n_D^{25}$ 1.4712.

*Analysis.* — Calcd. for $C_8H_{15}O_3Cl$: Cl, 18.22%. Found: Cl, 17.2%.

(b) Aqueous 50% sodium hydroxide (199 g., 2.48 moles) was added at 8° C. in one hour to a solution of the above primary tetrahydrofurfuryl 3-chloro-2-hydroxypropyl ether (369 g., 1.9 moles) in anhydrous ether (350 ml.). The white slurry which formed was stirred for one-half hour and refluxed for three hours. The mixture was cooled overnight, filtered, and the white solids on the filter were washed with anhydrous ether (150 ml.). The filtrate was separated. The pale yellow ether layer was dried over anhydrous magnesium sulfate and distilled to give 266 g. (88.5%) of tetrahydro-α-furfuryl glycidyl ether as a colorless oil, boiling range 58° C. (0.15 mm. Hg) to 68° C. (0.3 mm. Hg), $n_D^{25}$ 1.4530.

*Analysis.* — Calcd. for $C_8H_{14}O_3$: Oxirane oxygen, 10.11%. Found: Oxirane oxygen, 9.1%.

In another run a purer sample was obtained, boiling in the range 73° C. (0.4 mm. Hg) to 76° C. (0.5 mm. Hg), $n_D^{27}$ 1.4500, $d_{25}^{25}$ 1.0670.

*Analysis.*—Calcd. for $C_8H_{14}O_3$: C, 60.74%; H, 8.92%; oxirane oxygen, 10.11%. Found: C, 60.70%; H, 8.98%; oxirane oxygen, 10.00%.

(c) The tetrahydro-α-furfuryl glycidyl ether is effective against spores of the fungus *Alternaria solani*, giving a 77% inhibition at a concentration of 0.02% in water and 100% inhibition at 0.1% concentration.

*Example 2*

(a) Epichlorohydrin (29.6 g., 0.32 mole) was added in 50 minutes at 50° C. to a mixture of tetrahydro-β-furyl alcohol (111 g., 1.26 moles) and concentrated sulfuric acid (1 ml.). The mixture was heated at 85° C. for three hours, cooled, and 20 ml. of 6% sodium carbonate solution was added to neutralize the catalyst. 54 g. of tetrahydro-β-furyl alcohol was recovered on distillation and there was obtained 14.5 g. (25%) of tetrahydro-3-furyl 3-chloro-2-hydroxypropyl ether as a pale yellow straw-colored oil, boiling range 88° to 105° C. (0.2 mm.–0.15 mm. Hg), $n_D^{24}$ 1.4742.

When boron fluoride etherate was used as a catalyst, the same product was obtained as a pale straw-colored oil, boiling range 98° to 120° C. (0.15 mm. Hg), $n_D^{25}$ 1.4755.

*Analysis.*—Calcd. for $C_7H_{13}O_3Cl$: Cl, 19.7%. Found: Cl, 18.0%.

(b) Sodium hydroxide (50% solution, 17.5 g., 0.22 mole) was added at 8° C. in one-half hour to the above prepared tetrahydro-3-furyl 3-chloro-2-hydroxypropyl ether (30.5 g., 0.17 mole) in anhydrous ether (50 ml.). The mixture was stirred at room temperature for one-half hour, refluxed for three hours, cooled, filtered, and the white solids on the filter washed through with ether. The filtrate was separated. The ether layer, which had been dried over anhydrous magnesium sulfate, was distilled to give 12.5 g. (51%) of tetrahydro-3-furyl glycidyl ether as a colorless oil, boiling range 70° to 73° C. (0.2 mm. Hg), $n_D^{26}$ 1.4532, $d_{25}^{25}$ 1.1067.

*Analysis.*—Calcd. for $C_7H_{12}O_3$: C, 58.31%; H, 8.39%; oxirane oxygen, 11.11%. Found: C, 58.25%; H, 8.43%; oxirane oxygen, 10.1%.

Example 3

(a) Example 1(a) was repeated substituting 3-methyl-tetrahydro-α-furfuryl alcohol for the tetrahydrofurfuryl alcohol there used.

(b) Example 1(b) was repeated substituting 3-methyl-tetrahydro-α-furfuryl 3-chloro-2-hydroxypropyl ether obtained in part (a) hereof for the ether used as the reactant in Example 1(b). A 30% yield of 3-methyl-tetrahydro-α-furfuryl glycidyl ether was obtained.

Example 4

(a) Example 1(a) was repeated substituting 5-methyl-tetrahydro-β-furfuryl alcohol for the tetrahydrofuryl alcohol there used.

(b) Example 1(b) was repeated substituting the 5-methyl-tetrahydro-β-furfuryl 3-chloro - 2 - hydroxypropyl ether obtained in part (a) hereof for the ether used as the reactant in Example 1(b). A 30% yield of 5-methyl-tetrahydro-β-furfuryl glycidyl ether was obtained.

Example 5

(a) Example 1(a) was repeated substituting tetrahydro-β-furfuryl alcohol for the tetrahydrofurfuryl alcohol there used.

(b) Example 1(b) was repeated substituting the tetrahydro-β-furfuryl 3-chloro-2-hydroxypropyl ether obtained in part (a) hereof for the ether used as the reactant in Example 1(b). A 30% yield of tetrahydro-β-furfuryl glycidyl ether was obtained.

Example 6

(a) Example 1(a) was repeated substituting 3,5-dimethyl-tetrahydro-α-furfuryl alcohol for the tetrahydrofurfuryl alcohol there used.

(b) Example 1(b) was repeated substituting the 3,5-dimethyl-tetrahydro-α-furfuryl 3-chloro-2-hydroxypropyl ether obtained in part (a) hereof for the ether used as the reactant in Example 1(b). A 30% yield of the 3,5-dimethyl-tetrahydro-α-furfuryl glycidyl ether was obtained.

Example 7

A sample of rayon challis was saturated with an aqueous solution containing 20% tetrahydro-α-furfuryl glycidyl ether and 1.0% of zinc fluoborate. It was dried for five minutes at 240° F. and then heated for five minutes at 340° F. to complete the insolubilization and crosslinking of the cellulosic material in the fabric. After conditioning, the sample had a crease-recovery angle of 116°. Shrinkage on washing at 140° F. in neutral soap for one hour was under 2%.

Example 8

A sample of cotton printcloth was saturated with an aqueous solution containing 5% tetrahydro-β-furyl glycidyl ether and 0.4% of zinc perchlorate. It was dried for five minutes at 250° F. and then heated for five minutes at 340° F. to complete the insolubilization and crosslinking of the cellulosic material in the fabric. After conditioning, the sample had a crease-recovery angle of 109°.

By carrying out the same treatment but with the zinc perchlorate raised to 1%, a crease-recovery angle of 112° was reached.

Example 9

A sample of cotton printcloth was saturated with an aqueous solution containing 5% tetrahydro-α-furfuryl glycidyl ether and 0.4% of zinc fluoborate. It was dried for five minutes at 240° F. and then heated for five minutes at 340° F. to complete the insolubilization and crosslinking of the cellulosic material in the fabric. After conditioning, the sample had a crease-recovery angle of 105°.

Example 10

Example 9 was repeated but with the glycidyl ether used at a concentration of 20% and the zinc fluoborate used at a concentration of 0.6%. The recovery angle was 113°.

It is to be understood that changes and variations may be made without departing from the spirit and scope of the invention as defined in the appended claims.

I claim:

1. As a composition of matter, a compound of the formula

(I)

wherein one of the groups R is H, one of the groups R is selected from the group consisting of

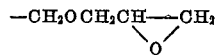

and

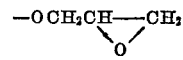

wherein the group

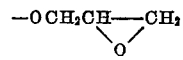

when present is in the β-position relative to the oxygen atom in the 5-membered ring so that there are at least two carbon atoms between each pair of oxygen atoms in the compound of the formula above, and each of the other two groups R is individually selected from the group consisting of H and $CH_3$.

2. Tetrahydro-α-furfuryl glycidyl ether.
3. Tetrahydro-β-furyl glycidyl ether.
4. Tetrahydro-β-furfuryl glycidyl ether.

References Cited in the file of this patent

UNITED STATES PATENTS

| | | |
|---|---|---|
| 2,515,123 | Hartough | July 11, 1950 |
| 2,532,279 | Alexander | Dec. 5, 1950 |
| 2,730,427 | Suen | Jan. 10, 1956 |
| 2,731,323 | Reinhardt | Jan. 17, 1956 |